US012762465B2

(12) United States Patent
Redfern et al.

(10) Patent No.: US 12,762,465 B2
(45) Date of Patent: Oct. 13, 2026

(54) BINARY MACHINE LEARNING NETWORK WITH OPERATIONS QUANTIZED TO ONE BIT

(71) Applicant: TEXAS INSTRUMENTS INCORPORATED, Dallas, TX (US)

(72) Inventors: Arthur John Redfern, Dallas, TX (US); Lijun Zhu, Plano, TX (US); Molly Katherine Newquist, Bloomington, IN (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1154 days.

(21) Appl. No.: 17/585,197

(22) Filed: Jan. 26, 2022

(65) Prior Publication Data

US 2023/0237368 A1 Jul. 27, 2023

(51) Int. Cl.
*G06N 20/00* (2019.01)
*G06F 17/15* (2006.01)

(52) U.S. Cl.
CPC ............. *G06N 20/00* (2019.01); *G06F 17/15* (2013.01)

(58) Field of Classification Search
None
See application file for complete search history.

(56) References Cited

U.S. PATENT DOCUMENTS

2020/0410318 A1* 12/2020 del Mundo .......... G06N 3/0495

OTHER PUBLICATIONS

Redfern et al (BCNN: A Binary CNN With All Matrix Ops Quantized to 1 Bit Precision Oct. 1, 2020) Retrieve from https://arxiv.org/pdf/2010.00704v1 (Year: 2020).*
Qin et al ("Bipointnet: Binary Neural Network for Point Clouds" 2021) (Year: 2021).*
Martinez et al ("Training Binary Neural Networks With Realto-Binary Convolutions" 2020) (Year: 2020).*
Zhao et al ("A Review of Recent Advances of Binary Neural Networks for Edge Computing" 2020) (Year: 2020).*
Shi et al ("Survey on Binary Neural Networks" 2019) (Year: 2019).*
Redfern, A. J. et al. "BCNN: A Binary CNN with All Matrix Ops Quantized to 1 Bit Precision." v.4 Mar. 5, 2021. Retrieved from: https://arxiv.org/abs/2010.00704.

* cited by examiner

*Primary Examiner* — Lut Wong
(74) *Attorney, Agent, or Firm* — Michelle F. Murray; Charles F. Koch

(57) ABSTRACT

Techniques for a machine learning model including the steps of summing values of a set of non-binary input feature values with bias values of a first set of bias values to generate first summed values; binarizing the first summed values; receiving a set of binary weights; performing a convolution operation on the binarized summed values and the set of binary weights to generate convolved output feature values; summing feature values of the convolved output feature values with bias values of a second set of bias values and applying a scale value of a first set of scale values to generate a first set of normalized feature values; summing the first set of normalized feature values with the non-binary input feature values to generate second summed values; and outputting a set of output feature values based on the second summed normalized feature values and non-binary input feature values.

20 Claims, 7 Drawing Sheets

BINARY MACHINE LEARNING NETWORK WITH OPERATIONS QUANTIZED TO ONE BIT

BACKGROUND

Machine learning (ML) is becoming an increasingly important part of the computing landscape. Machine learning may be implemented via ML models. Machine learning is a branch of artificial intelligence (AI), and ML models helps enable a software system to learn to recognize patterns from data without being directly programmed to do so. Neural networks (NN) are a type of ML model which utilize a set of linked and layered functions to evaluate input data. In some NNs, sometimes referred to as convolution NNs (CNNs), convolution operations are performed in NN layers based on inputs received and weights. Machine learning models are often used in a wide array of applications such as image classification, object detection, prediction and recommendation systems, speech recognition, language translation, sensing, etc.

As ML becomes increasingly useful, there is a desire to execute complex ML techniques, such as NNs and CNNs, efficiently in devices with relatively limited compute resources, such as embedded, or other low-power devices. Techniques for reducing complexity of ML techniques may be useful to help optimize performance of ML techniques on devices with relatively limited compute resources.

SUMMARY

An aspect of the present disclosure relates to a technique for ML modeling including receiving a set of non-binary input feature values. The technique also includes receiving a first set of bias values. The technique further includes summing values of the set of non-binary input feature values with bias values of the first set of bias values to generate first summed values. The technique also includes binarizing the first summed values. The technique further includes receiving a set of binary weights. The technique also includes performing a convolution operation on the binarized summed values and the set of binary weights to generate convolved output feature values. The technique further includes receiving a second set of bias values. The technique also includes receiving a first set of scale values. The technique further includes summing feature values of the convolved output feature values with bias values of the second set of bias values and applying a scale value of the first set of scale values to generate a first set of normalized feature values. The technique also includes summing the first set of normalized feature values with the non-binary input feature values to generate second summed values and outputting a set of output feature values based on the second summed values and non-binary input feature values.

Another aspect of the present disclosure relates to a non-transitory program storage device comprising instructions stored thereon to cause one or more processors to receive a machine learning model, the machine learning (ML) model including a set of building blocks wherein layers of the ML model may include one or more building blocks. The instructions further cause the one or more processors to receive a set of input data. The instructions also cause the one or more processors to replicate the set of input data. The instructions further cause the one or more processors to concatenate the replicated set of input data to the set of input data. The instructions also cause the one or more processors to normalize the set of input data to generate a set of non-binary input feature values. The instructions further cause the one or more processors to input the set of non-binary input feature values to a building block of the one or more building blocks, wherein each building block is configured to perform a first binary convolution operation based on the set of non-binary input feature values. The building block is further configured to perform a non-binary convolution operation on the output of the first binary convolution operation. The building block is also configured to perform a second binary convolution operation on the output of the non-binary convolution operation and output a set of non-binary output features based on the output of the second binary convolution operation.

Another aspect of the present disclosure relates to a device comprising one or more processors and a non-transitory program storage device comprising instructions stored thereon to cause the one or more processors to receive a machine learning model, the machine learning (ML) model including a set of building blocks wherein layers of the ML model may include one or more building blocks. The instructions further cause the one or more processors to receive a set of input data. The instructions also cause the one or more processors to replicate the set of input data. The instructions further cause the one or more processors to concatenate the replicated set of input data to the set of input data. The instructions also cause the one or more processors to normalize the set of input data to generate a set of non-binary input feature values. The instructions further cause the one or more processors to input the set of non-binary input feature values to a building block of the one or more building blocks, wherein each building block is configured to perform a first binary convolution operation based on the set of non-binary input feature values. The building block is further configured to perform a non-binary convolution operation on the output of the first binary convolution operation. The building block is also configured to perform a second binary convolution operation on the output of the non-binary convolution operation and output a set of non-binary output features based on the output of the second binary convolution operation.

BRIEF DESCRIPTION OF THE DRAWINGS

For a detailed description of various examples, reference will now be made to the accompanying drawings in which.

The same reference number is used in the drawings for the same or similar (either by function and/or structure) features.

DETAILED DESCRIPTION

As ML has becoming more common and powerful, it may be useful to execute ML models on lower cost hardware, such as low-powered devices, embedded device, commodity devices, etc. As used herein, an ML model may refer to an implementation of one or more ML algorithms which model an action, such as object detection, speech recognition, language translation, etc. In cases where a target hardware for executing ML models is expected to be a lower cost and/or power processor, the ML models may be optimized for the target hardware configurations to help enhance performance. To help an ML model execute on lower cost and/or power processors, ML models may be implemented with relatively low precision weights. Relatively low precision weights can reduce a complexity of a ML model by allowing relatively computationally difficult operations to be replaced by relatively simpler operations. For example, a ML model with 8-bit integer value weights may use a series of 8-bit matrix-matrix multiplication operations to apply weight values to a layer. Reconfiguring the ML model to use binary weights where the weights can have two values, such as (0, 1), (1, −1), etc. allows the 8 bit matrix-matrix multiplication operation to be replaced with a substantially simpler, binary matrix multiplication operation.

Figure 1A:
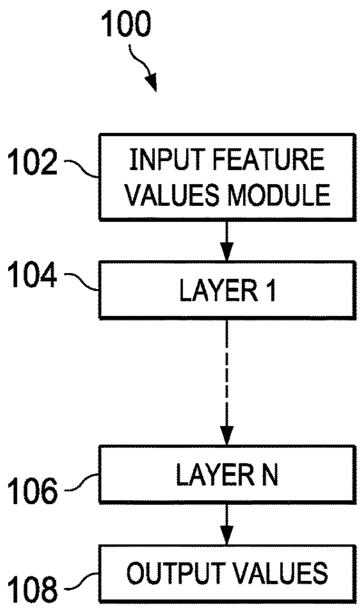
FIGS. 1A-1B are block diagrams illustrating structures of an example NN ML model, in accordance with aspects of the present disclosure.

FIG. 1A illustrates an example NN ML model 100, in accordance with aspects of the present disclosure. The example NN ML model 100 is a simplified example presented to help understand how an NN ML model 100, such as a CNN, is structured. Examples of NN ML models may include VGG, MobileNet, ResNet, EfficientNet, RegNet, etc. It may be understood that each implementation of an ML model may execute one or more ML algorithms and the ML model may be trained or tuned in a different way, depending on a variety of factors, including, but not limited to, a type of ML model being used, parameters being used for the ML model, relationships as among the parameters, desired speed of training, etc. In this simplified example, feature values are collected and prepared in an input feature values module 102. As an example, an image may be input into a ML model by placing the color values of pixels of the image maybe concatenated in, for example, a vector or matrix as the input feature values by the input features values module 102. Generally, parameters may refer to aspects of mathematical functions that may be applied by layers of the NN ML model 100 to features, which are the data points or variables.

Each layer (e.g., first layer 104 . . . Nth layer 106) may include a plurality of modules (e.g., nodes) and generally represents a set of operations that may be performed on the feature values, such as a set of matrix multiplications, convolutions, deconvolutions, etc. For example, each layer may include one or more mathematical functions that takes, as input (aside from the first layer 104), the output feature values from a previous layer. The ML model outputs output values 108 from the last layer (e.g., the Nth layer 106). Weights input to the modules of each layer may be adjusted during ML model training and fixed after the ML model training. In a ML model with binary weights, the weights may be limited to a set of two fixed values, such as (0, 1), (1, −1), etc. In some cases, the ML model may include any number of layers. Generally, each layer transforms M number of input features to N number of output features.

Figure 1B:
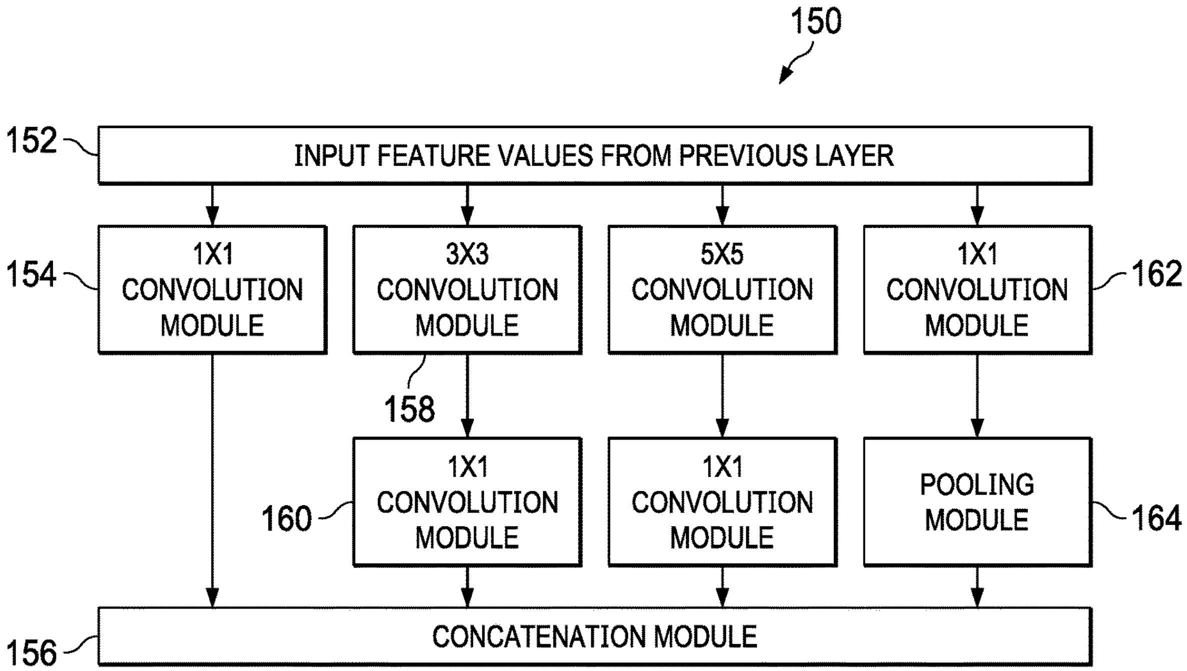

FIG. 1B illustrates an example structure of a layer 150 of the NN ML model 100, in accordance with aspects of the present disclosure. In some cases, one or more portions of the input feature values from a previous layer 152 (or input feature values from an input feature values module 102 for a first layer 104) may be input into a set of modules. Generally, modules of the set of modules may represent one or more sets of mathematical operations to be performed on the feature values and each module may accept, as input, a set of weights, scale values, and/or biases. For example, a first 1×1 convolution module 154 may perform a 1×1 convolution operation on one or more portions of the input feature values and a set of weights (and/or bias/scale values). Of note, sets of modules of the one or more sets of modules may include different numbers of modules. Thus, output from the first 1×1 convolution module 154 may be input to a concatenation module 156. As another example, one or more portions of the input feature values from a previous layer 152 may also be input to a 3×3 convolution module 158, which outputs to a second 1×1 convolution module 160, when then outputs to the concatenation module 156. Sets of modules of the one or more sets of modules may also perform different operations. In this example, output from third 1×1 convolution module 162 may be input to a pooling module 164 for a pooling operation. Output from the pooling module 164 may be input to the concatenation module 156. The concatenation module 156 may receive outputs from each set of modules of the one or more sets of modules and concatenate the outputs together as output feature values. These output feature values may be input to a next layer of the NN ML model 100.

Figure 2:
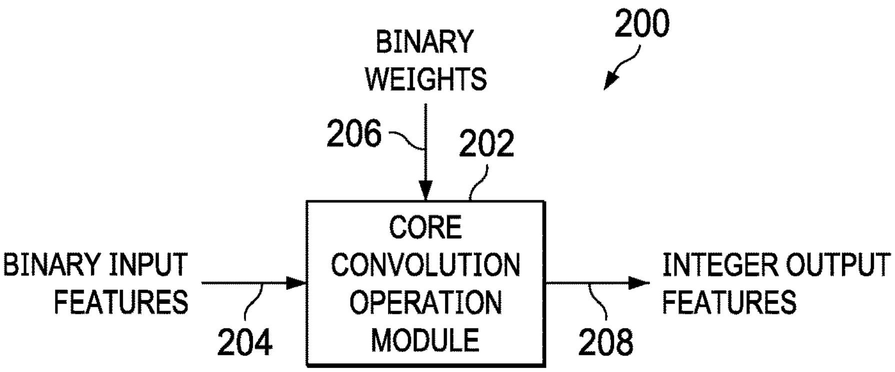
FIG. 2 is a conceptual diagram illustrating a core convolution operation module of a ML model, such as ML model, in accordance with aspects of the present disclosure.

FIG. 2 is a conceptual diagram 200 illustrating a core convolution operation module 202 of a ML model, such as ML model 100, in accordance with aspects of the present disclosure. The core convolution operation module 202 may be performed, for example, by a node of the ML model 100. As shown, the core convolution operation module 202 receives binary input features 204 where the features are represented as binary values. The core convolution operation module 202 also receives binary weights 206. The core convolution operation module 202 performs a convolution operation and output an integer output feature set 208. The integer output feature set 208 may then be used as input to another node of another layer of the ML model. As discussed below, the integer output feature set 208 may be converted to binary input feature set.

Generally, quantizing higher precision data, such as 32-bit precision data, to lower levels of precision, such as one bit (e.g., binary) precision data results in a loss of accuracy and techniques for mitigating this accuracy loss may be useful.

Figure 3:
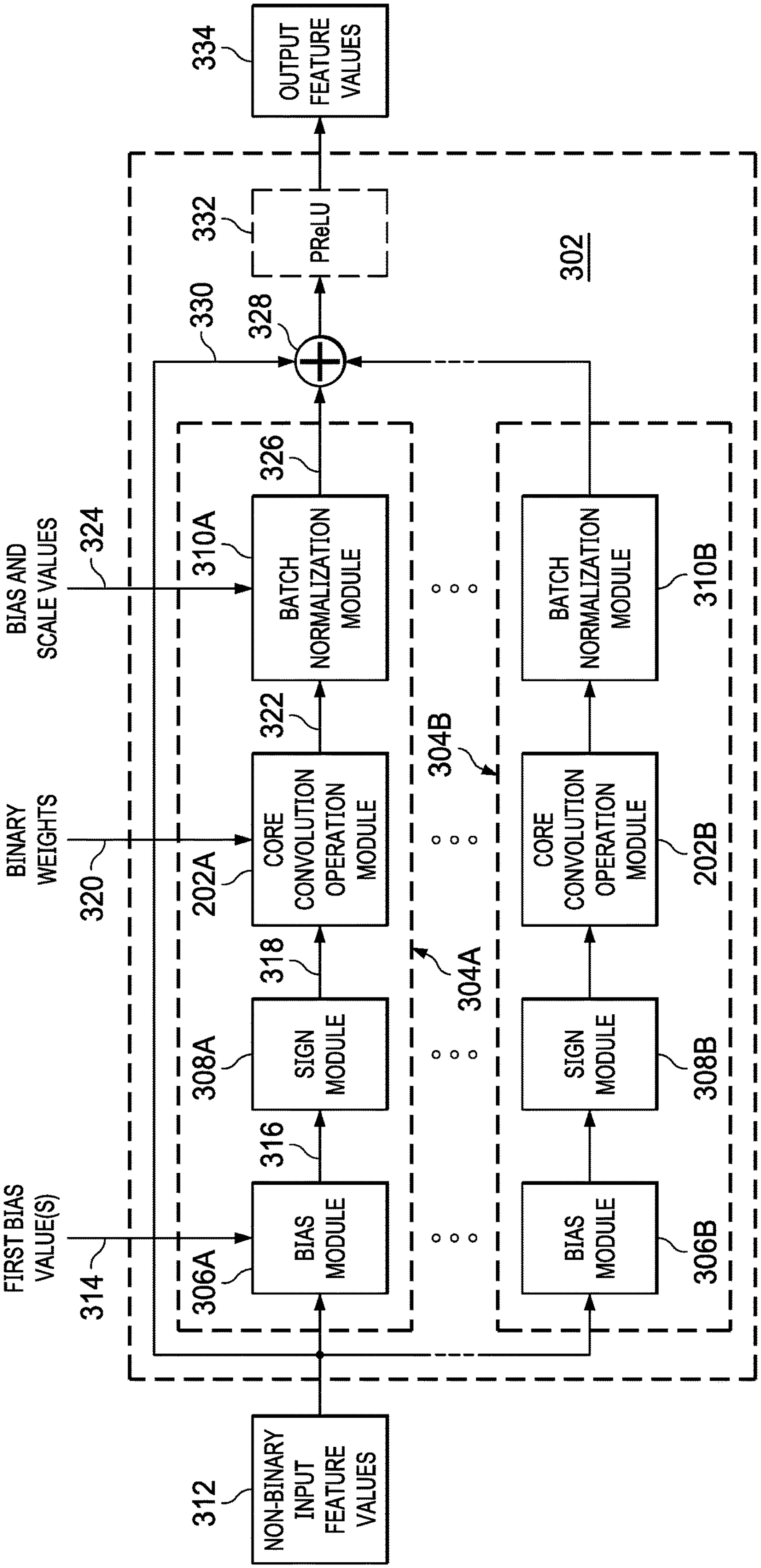
FIG. 3 is a block diagram illustrating a binary convolution module, in accordance with aspects of the present disclosure.

FIG. 3 is a block diagram 300 illustrating a binary convolution module 302, in accordance with aspects of the present disclosure. The binary convolution module 302 helps address the loss of accuracy resulting from binary data. The binary convolution module 302 can accept non-binary input, such as an integer output feature set, convert the non-binary input to binary, perform binary matrix operations, and output non-binary output. The binary convolution module 302 includes one or more parallel structures with a trainable bias before binarization and a trainable scale and bias before a combining operation. In this example, a first parallel structure 304A may include a bias module 306A, a sign module 308A, a core convolution operation module 202A, and a normalization module 310A. In some cases, the binary convolution module 302 may be used as building block for a ML model. In some cases, the binary convolution module 302 may be implemented using a set of nodes of the ML model and multiple binary convolution modules 302 may be used with a single layer of the ML model.

The bias module 306A of the first parallel structure 304A receives the non-binary input feature values 312, such as an integer output feature set. The bias module 306A may apply one or more first bias values 314 to values of the non-binary input feature values 312. These first bias values 314 may be determined, for example, during a training procedure for the ML model. In some cases, these first bias values 314 may be applied per channel. Returning to the image processing example, first bias values 314 may be applied to non-binary input feature values 312 by adding a bias value of the first bias values 314 and an input feature value of the non-binary input feature values 312. In some cases, different first bias values 314 may be applied to different portions of the non-binary input feature values 312. For example, different first bias values 314 may be applied values for each channel such that a different first bias values 314 are used on a per channel basis. In some cases, the first bias values 314 may be an integer (e.g., non-binary) and may be negative. The resulting biased output values are output 316 from the bias module 306A and input to the sign module 308A.

The sign module 308A may be configured to quantize values of the biased output values to binary values. In some cases, the sign module 308A may quantize the non-binary values of the biased output values based on whether a given input value is positive or negative (e.g., based on a sign of the value). As an example, with 8-bit input values for the non-binary input feature values 312, values may initially be from 0-255. A bias of −128 may be applied to the initial values resulting in values ranging from −128-+127. The sign module 308A may then quantize all of the values having a negative value to be −1 and all of the values having a positive value to be +1. How a value of zero is handled is a design choice and/or determined during training of the ML model. The sign module 306A may then output 318 binary feature values to the core convolution operation module 202A.

The core convolution module 202A receives a set of binary weights 320 and performs a convolution operation as between the binary feature values received from the sign module 306A and the binary weights 320. This convolution operation may be performed as a series of binary matrix multiplication operations. These binary matrix multiplication operations are substantially less complex to perform as compared to matrix multiplications operations with non-binary matrix values. The binary weights 320 are determined during training of the ML model. The core convolution module 202A may then output 322 convolved output features to the batch normalization module 310A.

The batch normalization module 310A may apply another one or more second bias values and scale the values. The batch normalization module 310A receives a set of bias and scale values 324. The second bias values, of the set of bias and scale values 324, may differ from the first bias values 314. The second bias values may be applied to the set of integer output features, for example, by adding a bias value to feature values of the convolved output features. In some cases, different second bias values may be applied to different portions of the convolved output features. For example, different second bias values may be applied to feature values for each channel such that different second bias values are used on a per channel basis. The batch normalization module 310A may also scale the values. This scaling of the values may be performed either prior to applying the bias or after applying the bias. In some cases, scaling may multiply the output feature values of the convolved output features with a received scaling value (e.g., scaling factor). In some cases, different scaling values may be applied to different portions of the convolved output features. For example, different scaling values may be applied to feature values for each channel such that different scaling values are used on a per channel basis. The batch normalization module 310A may output 326 normalized output feature values for input to adder 328.

In some cases, the binary convolution module 302 may include multiple parallel structures. As an example, the non-binary input feature values 312 may also be input to a second parallel structure 304B. The second parallel structure 304B also includes a bias module 306B, sign module 308B, core convolution operation module 202B, and batch normalization module 310B. The bias module 306B may also receive first bias values 314. The first bias values 314 received may be different for each parallel structure. For example, the first bias values 314 received by the bias module 306B of the second parallel structure 304B may differ from the first bias values 314 received by the bias module 306A of the first parallel structure 304A. Similarly, the binary weights 320 and bias and scale values 324 received may be different for each parallel structure. The different parallel structures 304 may then output different normalized output feature values. These different sets of normalized output feature values, along with the non-binary input feature values 312 received by adder 328 via an identity path 330, may be summed by adder 328. The identity path 330 may allow the non-binary input feature values 312 to be passed to adder 328. The adder 328 may then output summed output feature values. In some cases, the output of the adder 328 may be the output feature values 334.

Optionally, the output summed output feature values may be input to a programmable rectified linear unit 332 (PReLU). In some cases, the PReLU 332 may be configured to allow real values to pass through unchanged, while scaling negative values with trained scale factors. In some cases, the negative values may be scaled with different scaling values for different portions of the summed output feature values. For example, different scaling values may be applied to feature values for each channel such that different scaling values are used on a per channel basis. The output of the PReLU 332 may be the output feature values 334. Feature values of the output feature values 334 may be non-binary values.

Figure 4:
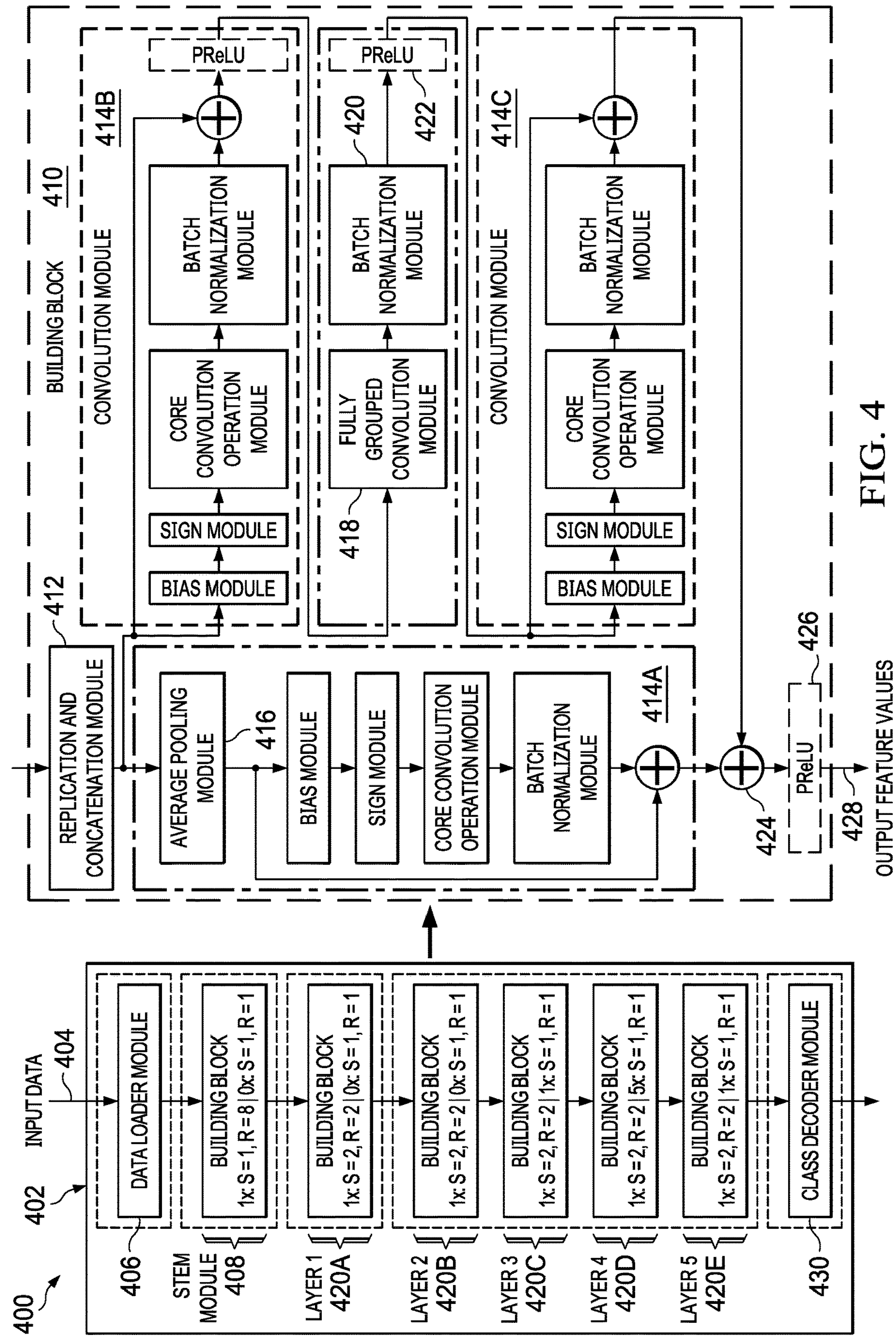
FIG. 4 is a block diagram illustrating an example ML model, in accordance with aspects of the present disclosure.

FIG. 4 is a block diagram 400 illustrating an example ML model 402, in accordance with aspects of the present disclosure. Initially, input data 404 may be input to a data loader module 406 of the ML model 402. As an example, the input data 404 may be image data including multiple channels of pixel color values (e.g., red, green, blue, etc. color values) for each pixel. The data loader may perform various data preparation tasks for the ML model, such as normalizing the data, concatenating, amending, scaling, generating, and/or integrating portions of the data, such as by generating an intensity channel, etc. This processed input data may be input feature values for layers of the ML model.

Output of the data loader module 406, may be input to a stem module 408. The stem module 408 may include one or more instances of a building block 410. In accordance with aspects of the present disclosure, layers 420A-420E (collectively 420) of the ML model 402, and the stem module 408, may be built using building blocks 410. Output of the layers 420 may be processed by a class decoder module 430 to generate an output of the ML model 402. The class decoder module 430 performs global avg pooling where each feature map is averaged to a single value to generate a vector result from the feature maps, followed by vector-matrix multiplication and a bias addition. The index of the largest value of the resulting vector corresponds to a dominant object in the input image.

The building blocks 410, in turn may be built using a set of binary convolution modules, such as binary convolution module 302 shown in FIG. 3. Multiple building blocks 410 may be used per layer 420 and/or stem module 408. For example, layer 4 420D in this example includes six instances (e.g., repetitions) of the building blocks 410, where one instance of the building block 410 is used configured with variable S (stride)=2 and variable R (replication)=2, and five instances of building block 410 configured with S=1 and R=1. The exact number of instances and configuration of the building blocks 410 (e.g., S and R values, number of parallel structures, PReLU usage, etc.) is a matter of ML network design and may be determined based on, for example, experimentation, iterative through trial and error, etc. In some cases, the exact number of instances and configuration of the building blocks 410 (e.g., S and R values) may be a trade-off between resource use and accuracy.

This example building block 410, includes a replication and concatenation module 412 along with three binary convolution modules 414A, 414B, and 414C that perform mixing of information across channels. Of note, binary convolution modules 414A, 414B, and 414C are shown in FIG. 4 with a single parallel structure, but it may be understood that the binary convolution modules 414A, 414B, and 414C, when present, may include one or more parallel structures. Where down sampling is to be applied to by a layer, the replication and concatenation module 412 may be configured to replicate the input feature values R number of times and then concatenate the replicated input feature values to the existing data in the channel dimension. For example, a 2× replication (i.e., R=2) may double the number of data channels and corresponding data in the data channels. The number of times the input data is replicated, R, may be determined during design of the ML model. The replicated and concatenated input feature values may be output to one or more binary convolution modules, such as binary convolution module 414A and 414B. Output from the binary convolution module 414B is non-binary and this output may be input to a fully grouped convolution module 418. The fully grouped convolution module 418 may perform a fully grouped spatial convolution (e.g., non-binary convolution operation) on the non-binary output of binary convolution module 414B. Output from the fully grouped convolution module may be input to a batch normalization module 418 and output from the batch normalization module 420 may optionally be input to a PReLU 422. The batch normalization module 420 and PReLU 422 may operate substantially similar to batch normalization module 310A and PReLU 332 of FIG. 3. Output from the PReLU 422 or batch normalization module 420 may be input to binary convolution module 414C.

The binary convolution module 414C performs another binary convolution operation across the channels of the output of the PReLU 422 or the normalized intermediate feature values to generate feature values. The feature values may be summed by adder 424 with the output of binary convolution module 414A or the replicated and concatenated input data (e.g., via the identity path). Output of adder 424 may optionally be input to PReLU 426. The PReLU 426 may allow real values to pass through while scaling negative values. Output of the PReLU 426 or adder 424 may be output from the building block 410 as output feature values 428. The output feature values 428 may be input to other building blocks 410 as input data 404.

In some cases, the building block 410 may be configurable based, for example, on processing to be performed by a particular layer of the ML model 402. For example, where a layer is to be configured to downsample the data input into the layer (e.g., reduce a number of rows/columns of the data), the corresponding binary convolution module 414A may include an average pooling module 416 which may be configured to pool certain data points (for example, based on S value), such as by averaging a certain number of data values into a single output data value. In some cases, downsampling may also be used where the input data is replicated (i.e., R>1). In cases where replication and spatial down sampling is not applied (i.e., R=1, S=1), the binary convolution module 414A may be omitted and may be replaced, for example, by an identity path. The identity path may be substantially similar to identity path 330 in FIG. 3. In some cases, a number of the parallel structures may be adjusted for each binary convolution module 414 of the building block 410. The number of parallel structures may be adjusted at design time, for example, based on experimentation, design choices, and performance/accuracy trade-offs.

Where the input data is replicated (i.e., R>1) and downsampling occurs via an average pooling module 416, the output of binary convolution module 414A may have a different size as compared to the input into binary convolution module 414A. The binary convolution module 414B is configured to perform a binary convolution across the channels of the input data 404 without affecting the size of the data. Thus, the size and dimensions of the output of binary convolution module 414B may differ from the size and dimensions of the output of binary convolution module 414A. To help address this size mismatch, the output of binary convolution module 414B may be input to a fully grouped convolution module 418. As indicated the binary convolution module 414B performs a convolution operation across the channels of the input data. The fully grouped convolution module 418 may perform a convolution operation across space (i.e., the convolution operation is performed spatially across the values within a channel and outputs to a corresponding channel). This convolution operation is performed on non-binary values, rather than binary values. However, as the values are fully grouped within a channel, the convolution operation may be performed as a series of vector-matrix operations, as opposed to matrix-matrix operations for non-fully grouped values. This vector-matrix operation may be substantially simpler, computationally on certain processors, as compared to matrix-matrix operations for real values. Of note, all matrix-matrix operations for the building block 410 are fully binary operations as the fully grouped convolution module 418 performs a vector-matrix operation.

The fully grouped convolution module 418, as it performs operations spatially across channels, may also be configured to skip certain data points (for example, based on S value). Batch normalization may then be performed on the output of the fully grouped convolution module 418 by the batch normalization module 420 to generate feature values. Optionally, the feature values output by the batch normalization module 420 may be input to a PReLU 422 to scale negative values. The output of the PReLU 422 or the feature values may then be input to the binary convolution module 414C.

Figure 5:
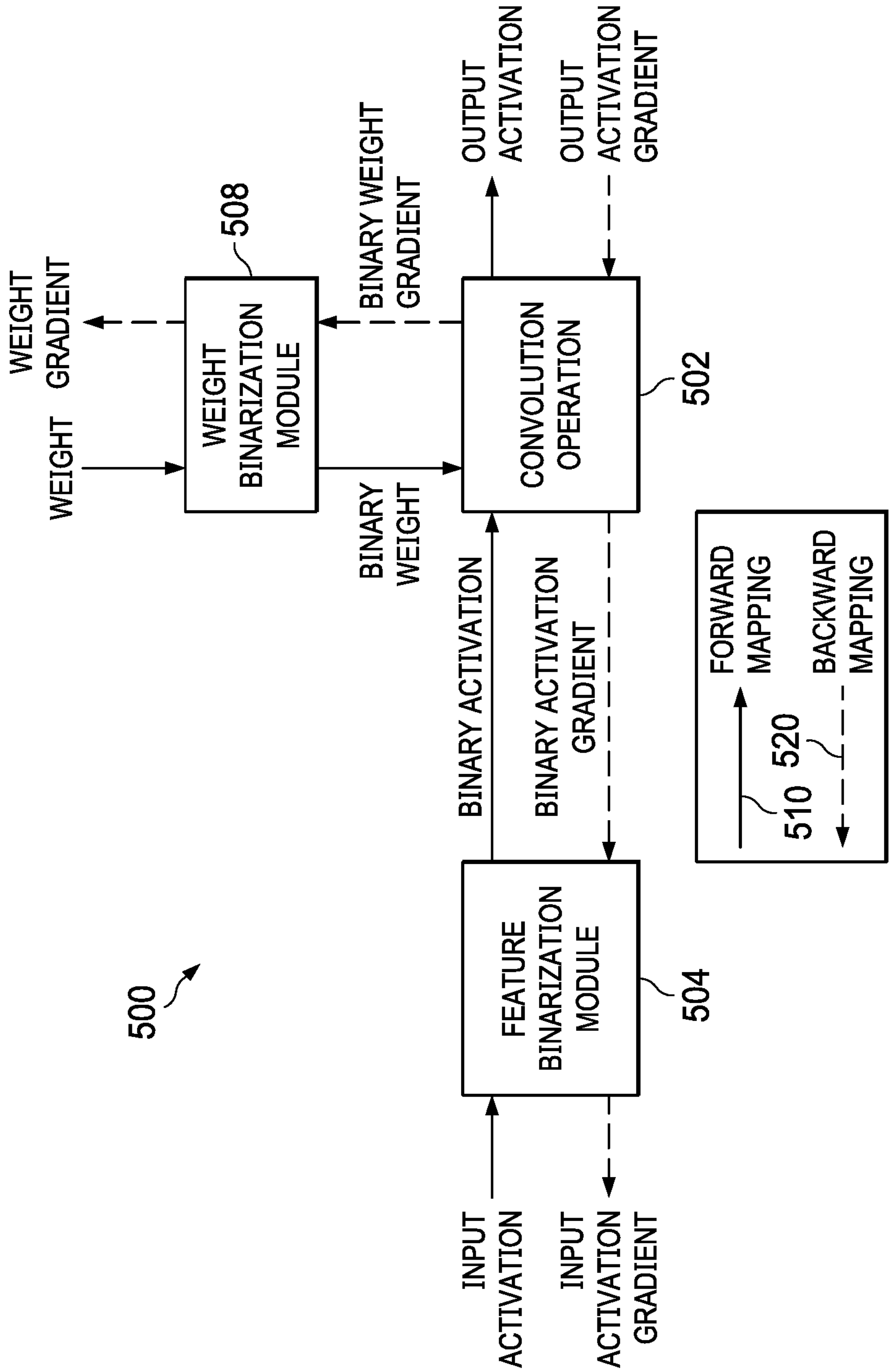
FIG. 5 is a block diagram illustrating a technique for training a ML model including building blocks based on core convolution operation modules, in accordance with aspects of the present disclosure.

FIG. 5 is a block diagram 500 illustrating a technique for training a ML model including building blocks based on core convolution operation modules, in accordance with aspects of the present disclosure. Training a ML model, such as ML model 402 which includes building blocks, such as building block 410, may be performed in a manner similar to training for ReActNet based ML models. The training may include forward mapping 510 of inputs to outputs based on weights, as well as a backward mapping 520 from outputs to inputs.

As an example for forward mapping 510, fora particular convolution operation 502, and input feature value for training may be input as an input activation to a feature binarization module 504 which converts the feature value to a binary value. The binary activation output by the feature binarization module 504 may be input to the convolution operation 502, which may be a core convolution operation module. The convolution operation 502 may be performed based on binary weights input from a weight binarization module 508. The weight binarization module 508 may operate in a way substantially similar to the feature binarization module 506 to convert received weights to binary values. The output activation of the convolution operation 502 may be compared to expected results as a part of the training operation.

In some cases, the backward mapping 520 may utilize different functions from the forward mapping as some binary operations may remove the activation gradient. As an example of backward mapping 520, an output activation gradient indicating the mapping of output of the convolution operation 502 may be mapped to binary inputs of the convolution operation 502 and then converted to non-binary by the feature binarization module 504. The mapping also takes into account binary weights input to the convolution operation 502 output by the weight binarization module 508, along with corresponding weights input to the weight binarization module 508.

In some cases, training may be a two step procedure using binary activations (feature values) and non-binary (e.g., real) weight values for a first step. In some cases, the weight binarization module 504 may be disabled or otherwise not used for the first step. The initial training step with non-binary weight values helps approximate the weight values. The second step may use binary activations and binary weights to obtain the final weight values.

In some cases, the implementation of a ML model including building blocks based on core convolution operation modules may be adapted based on the hardware the ML model is to be executed on. For example, a ML model may be targeted to operated on certain hardware and the ML model may be adjusted to take advantage of features of the hardware to help improve performance of the ML model.

Figure 6:
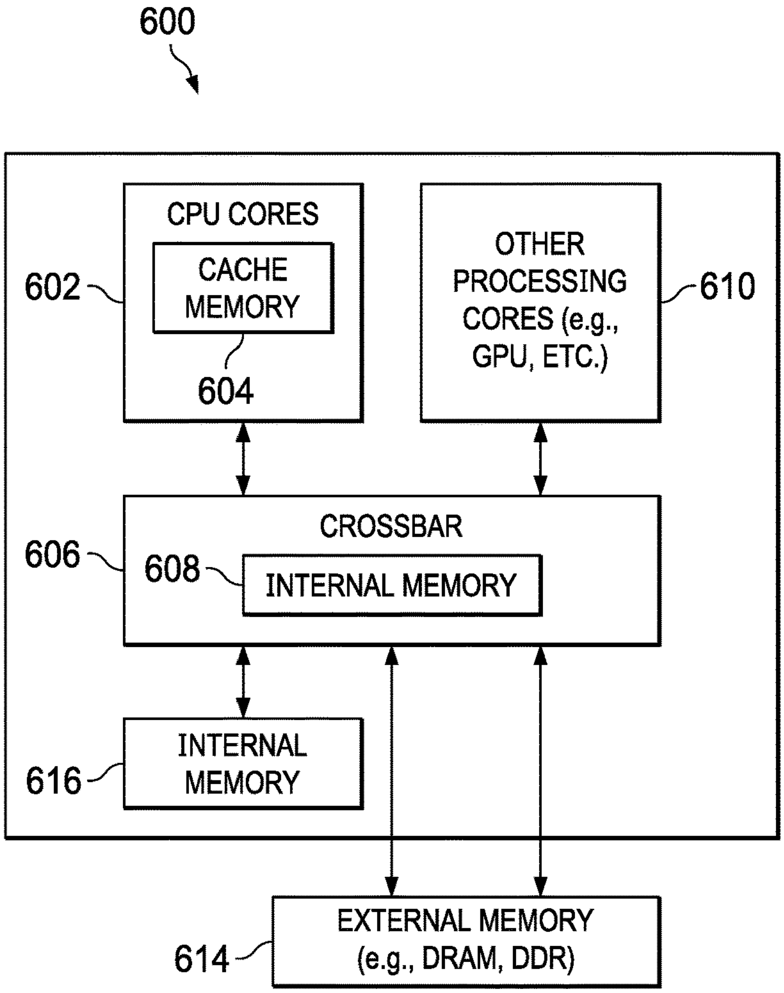
FIG. 6 is a block diagram of a device including hardware for executing ML models, in accordance with aspects of the present disclosure.

FIG. 6 is a block diagram 600 of a device including hardware for executing ML models, in accordance with aspects of the present disclosure. The device may be system on a chip (SoC) including multiple components configured to perform different tasks. As shown, the device includes one or more central processing unit (CPU) cores 602, which may include one or more internal cache memories 604. The CPU cores 602 may be configured for general computing tasks.

The CPU cores 602 may be coupled to a crossbar (e.g., interconnect) 606, which interconnects and routes data between various components of the device. In some cases, the crossbar 606 may be a memory controller or any other circuit that can provide an interconnect between peripherals. Peripherals may include components that access memory, such as various processors, processor packages, direct memory access/input output components, etc. and memory components, such as double data rate random access memory, other types of random access memory, direct memory access/input output components, etc. In this example, the crossbar 606 couples the CPU cores 602 with other peripherals, such as other processing cores 610, for example a graphics processing unit, radio basebands, coprocessors, microcontrollers, etc., and external memory 614, such as double data rate (DDR) memory, dynamic random access memory (DRAM), flash memory, etc., which may be on a separate chip from the SoC. The crossbar 606 may include or provide access to one or more internal memories, such as internal memory 616, that may include any type of memory, such as static random access memory (SRAM), flash memory, etc. In some cases, the crossbar 606 may itself include one or more internal memories 608. In some cases, the other processing cores 610 may include processing cores configured to perform specific operations, such as vector-matrix multiplication or matrix-matrix multiplication.

Figure 7:
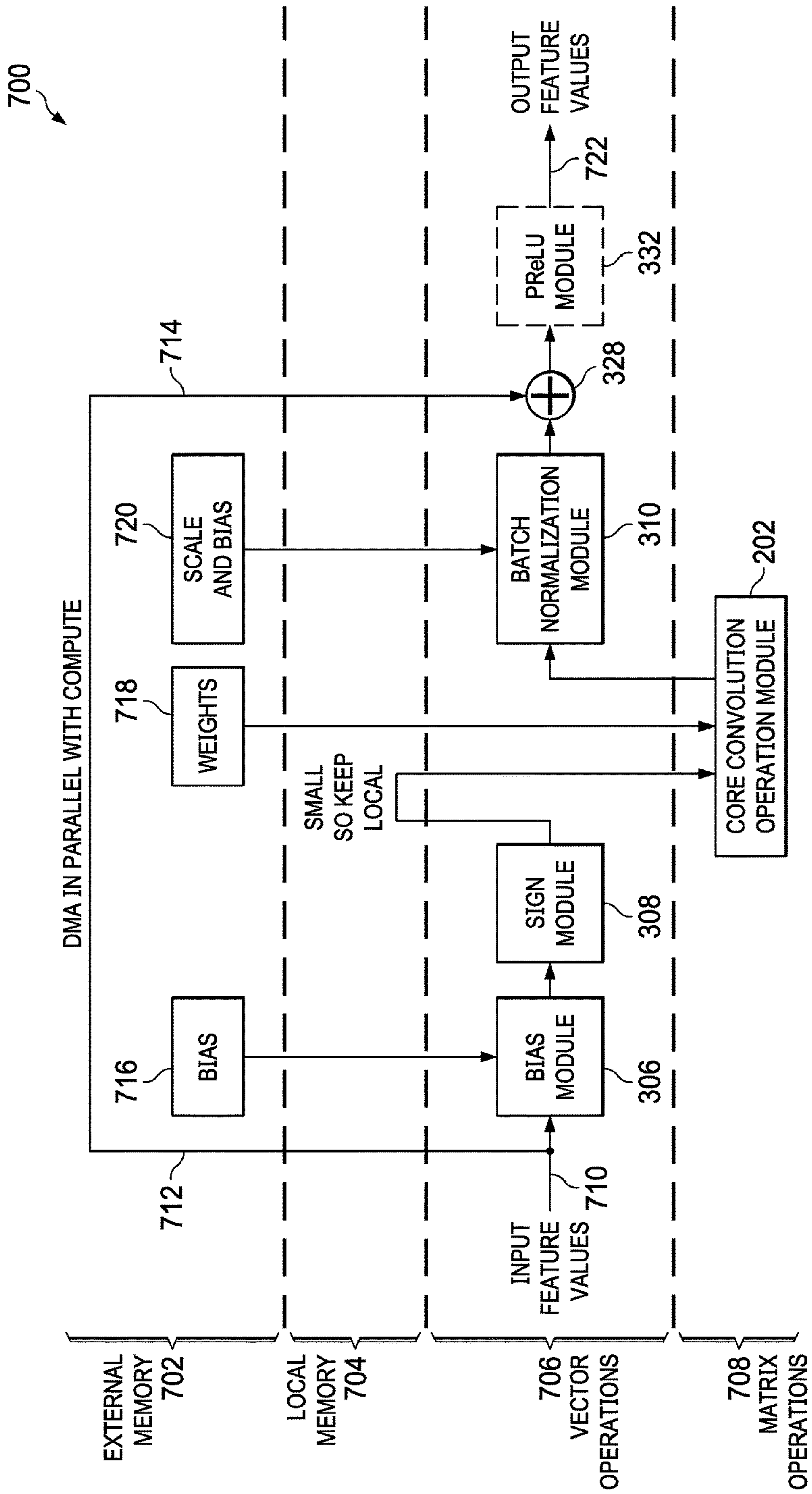
FIG. 7 is a block diagram illustrating data movement for executing a ML model including building blocks based on core convolution operation modules, in accordance with aspects of the present disclosure.

FIG. 7 is a block diagram 700 illustrating data movement for executing a ML model including building blocks based on core convolution operation modules, in accordance with aspects of the present disclosure. The block diagram 700 shows how data may be moved for modules of a binary convolution module, such as binary convolution module 302 of FIG. 3, are executed on certain hardware components, such as the device illustrated in diagram 600 of FIG. 6. As shown, data may be moved as between an external memory 702, a local memory 704, a processor for performing vector operations 706, and a processor for performing matrix operations 708. The external memory 702 may correspond to the external memory 614 of FIG. 6. The internal memory may correspond to any on SoC memory, such as internal memory 608 and cache memories 604. The processor for performing vector operations 706 and the processor for performing matrix operations 708 may correspond to the CPU cores 602 or any other processing cores 610 configurable to perform such operations.

As shown feature values output from a previous layer may be input as input feature values 710 to the bias module 306 of the present binary convolution module. As the input feature values 710 are also used by adder 328 via the identity path, the input feature values 710 may be stored into the external memory 702. Input feature values 710 may be relatively large as the input feature values 710 contains non-binary feature values, so storage 712 and loading 714 of the input feature values 710 to and from the external memory 702 may be performed in parallel with other operations of the binary convolution module. The input feature values 710 are input to the bias module 306 along with bias values 716. The bias values 716 may be loaded from external memory 702. In some cases, a number of bias values 716 to be loaded from the external memory 702 is relatively small as compared to the input feature values 710 and the bias values 716 may be loaded with relatively few operation and relatively quickly from the external memory 702. The bias module 306 may apply the bias values 716 to the input feature values 710 as a set of vector operations 706. The output of the bias module 306 may be input to the sign module 308. The sign module 308 may also execute as a set of vector operations 706 and may be performed without writing the full output of the bias module 306 to an internal or external memory. In some cases, the operations performed by the sign module 308 may be integrated with the operations performed by the bias module 306 and portions of the output of the bias module 306 may be stored, for example, in registers internal to the processor performing the vector operations 706. As the sign module 308 quantizes input feature values to binary feature values, the output of the sign module 308 is relatively small and may be stored completely in local memory 704 before being input to the core convolution operation module 202.

The core convolution operation module 202 may perform matrix operations 708 on the binary feature values. These matrix operations 708 may be performed on a processor separate from the processor performing the vector operations 706. Weights 718 may be input to the core convolution module 202 from the external memory 702. As the weights 718 are binary, the size of the weights 718 are relatively small and the memory load operation from the external memory may be performed relatively quickly. Output of the core convolution operation module 202 may be input to the batch normalization module 310, which may perform vector operations 706. Scale and bias information 720 may be input to the batch normalization module 310 from the external memory 702. As with bias 716, the scale and bias information 720 is relatively small and may be loaded from the external memory 702 relatively quickly. Output from the batch normalization module 310 may be summed with the input feature values 710 by adder 328. As indicated above, the input features values 710 may be stored 712 and loaded 714 from the external memory 702 in parallel to other operations of the binary convolution module as the input feature values 710 are relatively large. Output of the adder 328 may be input to the PReLU module 332. As shown vector operations 706 may be performed by the adder 328 and PReLU module 332 and may be performed without writing the full output of the adder 328 to an internal or external memory. Output feature values 722 output by the PReLU module 332 may be used as input feature values 710 to another binary convolution module.

Additionally, further hardware optimizations to take advantage of binary matrix—matrix operations may be possible beyond those discussed herein. For example, a processor configured especially for binary matrix—matrix multiplication may be configured for 1 bit precision rather than higher bit precision, such as 8-bit, 16-bit, etc. In some cases, the processor instructions for a binary operation may be adjusted to better accommodate binary matrices. For example, a processor instruction may normally accept two inputs and generate a single output. The input may be configured to accept binary inputs while the output may be configured to produce non-binary output (e.g., 8-bit values). In such a case, there may be an imbalance between a number of input bits and output bits as the size of the output bits are larger (e.g., 8× larger with 8-bit values) as compared to the input, binary inputs. To help balance this input size/output size, the inputs to the processor instruction may remain multi-bit and the matrix dimensions of the input may be reshaped to better fit the size of the multi-bit input of the processor instruction. These resized matrices may include rectangular matrices.

Figure 8:
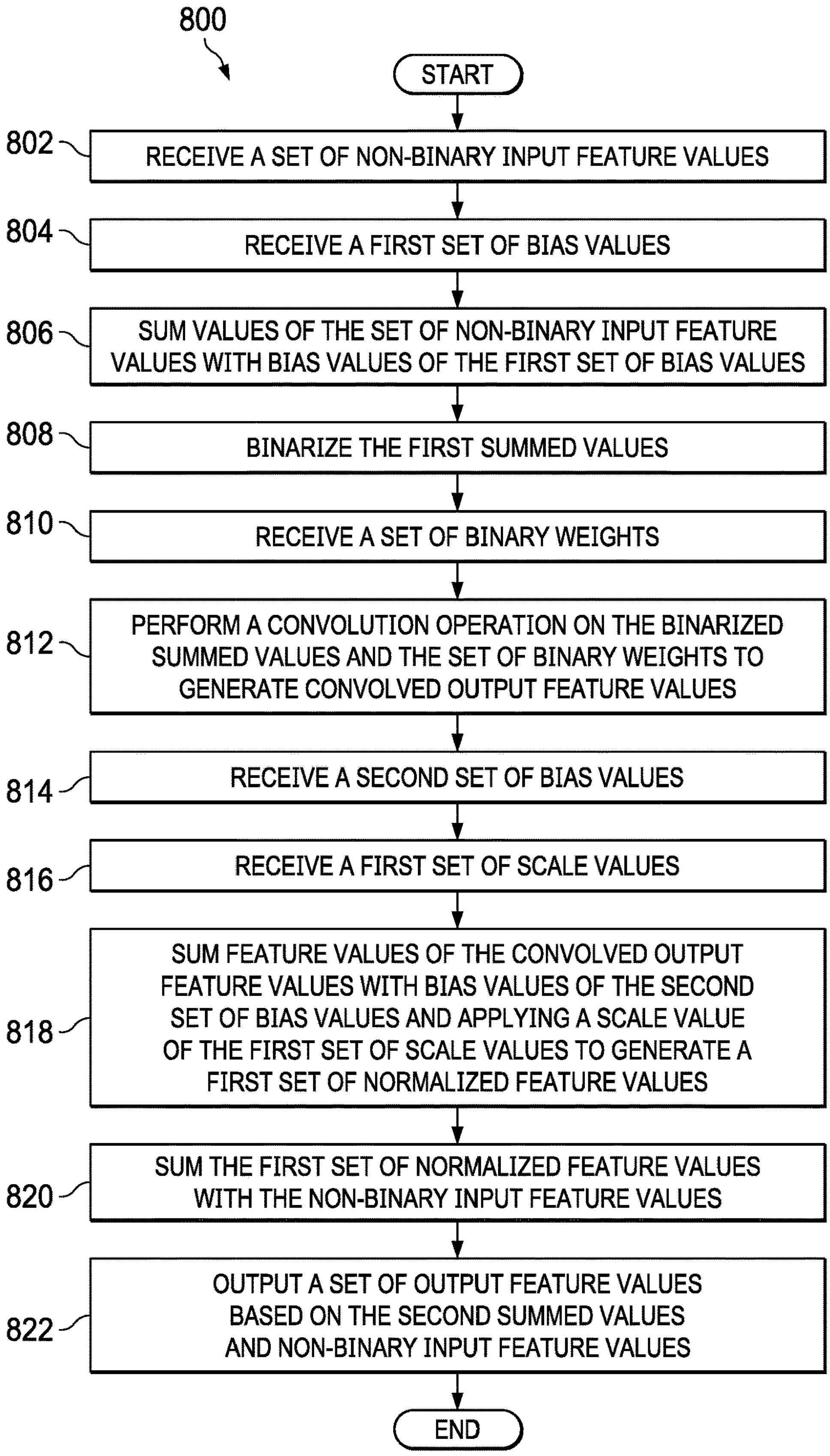
FIG. 8 is a flow diagram illustrating a technique for performing a binary convolution, in accordance with aspects of the present disclosure.

FIG. 8 is a flow diagram 800 illustrating a technique for performing a binary convolution, in accordance with aspects of the present disclosure. At block 802, a set of non-binary input feature values is received. For example, a multi-dimensional matrix of real (e.g., multi-bit) feature values may be received by a binary convolution module. At block 804, a first set of bias values is received. For example, a bias module of the binary convolution module may receive bias values. These bias values may be non-binary. At block 806, values of the set of non-binary input feature values are summed with bias values of the first set of bias values to generate first summed values. For example, the bias module may apply the bias values to the input feature values. At block 808, the first summed values are binarized. For example, output of the bias module may be input to a sign module. The sign module may quantize the non-binary input to binary values (i.e., can have one of two values). In some cases, this binarization may be performed based on a sign of values of the input values. For example, input values that are negative may be binarized to −1, while input values which are positive may be binarized to 1. How zero is binarized is a design choice. At block 810 a set of binary weights are received. For example, a core convolution module may receive a set of weights. Weights of the set of weights are binary values. At block 812, a convolution operation is performed on the binarized summed values and the set of binary weights to generate convolved output feature values. For example, the core convolution module may convolve the output of the sign module with the weights. This convolution is performed as a binary matrix—matrix operation. At block 814, a second set of bias values are received. For example, a batch normalization module may receive the second set of bias values. Values of this second set of bias values may be real values. At block 816, a first set of scale values are received. For example, the batch normalization module may also receive scale values. At block 818, feature values of the convolved output feature values are summed with bias values of the second set of bias values and a scale value of the first set of scale values is applied to generate a first set of normalized feature values. For example, the batch normalization module may apply the second set of bias values to the convolved output feature values and scale the results. At block 820, the first set of normalized feature values are summed with the non-binary input feature values to generate second summed values. For example, an adder may sum the output of the batch normalization module with non-binary input feature values via an identity path. At block 822, a set of output feature values are output based on the second summed values and non-binary input feature values.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. Circuits described herein are reconfigurable to include additional or different components to provide functionality at least partially similar to functionality available prior to the component replacement. Modifications are possible in the described examples, and other examples are possible within the scope of the claims.

What is claimed is:

1. A non-transitory computer readable storage device storing instructions stored thereon that, when executed, cause one or more processors to:

receive a machine learning model, the machine learning (ML) model including a set of building blocks, wherein layers of the ML model includes one or more building blocks;

receive a set of input data;

replicate the set of input data;

concatenate the replicated set of input data to the set of input data to produce concatenated input data;

normalize the concatenated input data to generate a first set of non-binary input feature values; and input the first set of non-binary input feature values to a building block of the one or more building blocks, wherein the building block is configured to:

perform a first binary convolution operation based on the first set of non-binary input feature values, comprising:

receiving the first set of non-binary input feature values;

binarizing the first set of non-binary input feature values;

performing a first convolution operation on the binarized input feature values to generate first non-binary convolved output;

performing a grouped convolution operation on the first non-binary convolved output;

normalizing an output of the grouped convolution operation to generate normalized intermediate feature values;

binarizing the normalized intermediate feature values;

performing a second convolution operation on the binarized normalized intermediate feature values to generate convolved intermediate feature values; and outputting a first set of non-binary output features based on the convolved intermediate feature values;

perform a non-binary convolution operation based on the first set of non-binary output features to produce a second set of non-binary input feature values;

perform a second binary convolution operation based on the second set of non-binary input feature values to produce a second set of non-binary output features; and output the second set of non-binary output features.

2. The non-transitory computer readable storage device of claim 1, wherein performing the second binary convolution operation comprises:

receiving the second set of non-binary input feature values;

binarizing the second set of non-binary input feature values;

performing a first convolution operation on the second set of binarized input feature values to generate second non-binary convolved output;

performing a fully grouped convolution operation on the second non-binary convolved output;

normalizing an output of the grouped convolution operation to generate second normalized intermediate feature values;

binarizing the second normalized intermediate feature values;

performing a second convolution operation on the second binarized normalized intermediate feature values to generate second convolved intermediate feature values; and outputting the second set of non-binary output features based on the second convolved intermediate feature values.

3. The non-transitory computer readable storage device of claim 1, wherein the instructions are further configured to cause the one or more processors to:

replicate the first set of non-binary input feature values; and concatenate the replicated set of non-binary input feature values with the set of non-binary input feature values to generate replicated and concatenated feature values.

4. The non-transitory computer readable storage device of claim 3, wherein the instructions for at least one building block of the one or more building blocks are further configured to cause the one or more processors to:

perform a third binary convolution operation based on the replicated and concatenated feature values; and sum the convolved replicated and concatenated feature values with the convolved intermediate feature values.

5. The non-transitory computer readable storage device of claim 4, wherein the instructions for at least one building block of the one or more building blocks are further configured to cause the one or more processors to scale negative values of the summed convolved replicated and concatenated feature values and the convolved intermediate feature values to generate the set of non-binary output features.

6. The non-transitory computer readable storage device of claim 1, wherein the instructions further cause the one or more processors to sum the set of non-binary input feature values with the convolved intermediate feature values.

7. The non-transitory computer readable storage device of claim 1, wherein the instructions further cause the one or more processors to binarize the set of non-binary input feature values by assigning a binary value based on a sign of a value of the set of non-binary input feature values.

8. A device, comprising:

one or more processors; and a memory, and wherein instructions stored in the memory cause the one or more processors to:

receive a machine learning model, the machine learning (ML) model including a set of building blocks wherein layers of the ML model includes one or more building blocks;

receive a set of input data;

replicate the set of input data;

concatenate the replicated set of input data to the set of input data to produce concatenated input data;

normalize the concatenated input data to generate a first set of non-binary input feature values; and input the first set of non-binary input feature values to a building block of the one or more building blocks, wherein the building block is configured to:

perform a first binary convolution operation based on the set of non-binary input feature values, comprising receiving the first set of non-binary input feature values;

binarizing the set of non-binary input feature values;

performing a first convolution operation on the binarized input feature values to generate first non-binary convolved output;

performing a grouped convolution operation on the first non-binary convolved output;

normalizing an output of the grouped convolution operation to generate normalized intermediate feature values;

binarizing the normalized intermediate feature values;

performing a second convolution operation on the binarized normalized intermediate feature values to generate convolved intermediate feature values; and outputting a first set of non-binary output features based on the convolved intermediate feature values;

perform a non-binary convolution operation based on the first set of non-binary output features to produce a second set of non-binary input feature values; and perform a second binary convolution operation based on the second set of non-binary output features to produce a second set of non-binary output features; and output the second set of non-binary output features.

9. The device of claim 8, wherein the performing the second binary convolution operation comprises:

receiving the second set of non-binary input feature values;

binarizing the second set of non-binary input feature values;

performing a first convolution operation on the second set of binarized input feature values to generate a second non-binary convolved output;

performing a grouped convolution operation on the first second non-binary convolved output;

normalizing an output of the grouped convolution operation to generate second normalized intermediate feature values;

binarizing the second normalized intermediate feature values;

performing a second convolution operation on the second set of binarized normalized intermediate feature values to generate second convolved intermediate feature values; and output a second set of non-binary output features based on the second convolved intermediate feature values.

10. The device of claim 8, wherein the instructions further cause the one or more processors to:

replicate the first set of non-binary input feature values; and concatenate the replicated set of non-binary input feature values with the set of non-binary input feature values to generate replicated and concatenated feature values.

11. The device of claim 10, wherein the instructions for at least one building block of the one or more building blocks further cause the one or more processors to:

perform a third binary convolution operation based on the replicated and concatenated feature values; and sum the convolved replicated and concatenated feature values with the convolved intermediate feature values.

12. The device of claim 11, wherein the instructions for at least one building block of the one or more building blocks further cause the one or more processors to scale negative values of the summed convolved replicated and concatenated feature values and the convolved intermediate feature values to generate the set of non-binary output features.

13. The device of claim 8, wherein the instructions further cause the one or more processors to sum the set of non-binary input feature values with the convolved intermediate feature values.

14. A method comprising:

receiving a machine learning model, the machine learning (ML) model including a set of building blocks, wherein layers of the ML model includes one or more building blocks;

receiving a set of input data;

replicating the set of input data;

concatenating the replicated set of input data to the set of input data to produce concatenated input data;

normalizing the concatenated input data to generate a first set of non-binary input feature values; and inputting the first set of non-binary input feature values to a building block of the one or more building blocks, for the building block:

performing a first binary convolution operation based on the first set of non-binary input feature values, comprising:

receiving the first set of non-binary input feature values;

binarizing the first set of non-binary input feature values;

performing a first convolution operation on the binarized input feature values to generate first non-binary convolved output;

performing a grouped convolution operation on the first non-binary convolved output;

normalizing an output of the grouped convolution operation to generate normalized intermediate feature values;

binarizing the normalized intermediate feature values;

performing a second convolution operation on the binarized normalized intermediate feature values to generate convolved intermediate feature values; and outputting a first set of non-binary output features based on the convolved intermediate feature values;

performing a non-binary convolution operation based on the first set of non-binary output features to produce a second set of non-binary input feature values;

performing a second binary convolution operation based on the second set of non- binary input feature values to produce a second set of non-binary output features; and outputting the second set of non-binary output features.

15. The method of claim 14, wherein performing the second binary convolution operation comprises:

receiving the second set of non-binary input feature values;

binarizing the second set of non-binary input feature values;

performing a first convolution operation on the second set of binarized input feature values to generate second non-binary convolved output;

performing a grouped convolution operation on the second non-binary convolved output;

normalizing an output of the grouped convolution operation to generate second normalized intermediate feature values;

binarizing the second normalized intermediate feature values;

performing a second convolution operation on the second binarized normalized intermediate feature values to generate second convolved intermediate feature values; and outputting the second set of non-binary output features based on the second convolved intermediate feature values.

16. The method of claim 15, further comprising:

replicating the first set of non-binary input feature values; and concatenate the replicated set of non-binary input feature values with the set of non-binary input feature values to generate replicated and concatenated feature values.

17. The method of claim 16, further comprising:

performing a third binary convolution operation based on the replicated and concatenated feature values; and summing the convolved replicated and concatenated feature values with the convolved intermediate feature values.

18. The method of claim 17, further comprising scaling negative values of the summed convolved replicated and concatenated feature values and the convolved intermediate feature values to generate the set of non-binary output features.

19. The method of claim 14, further comprising summing the set of non-binary input feature values with the convolved intermediate feature values.

20. The method of claim 14, further comprising binarizing the set of non-binary input feature values by assigning a binary value based on a sign of a value of the set of non-binary input feature values.

* * * * *